(No Model.)
J. J. JOHNSTON.
DINNER POT.
No. 265,610.
Patented Oct. 10, 1882.
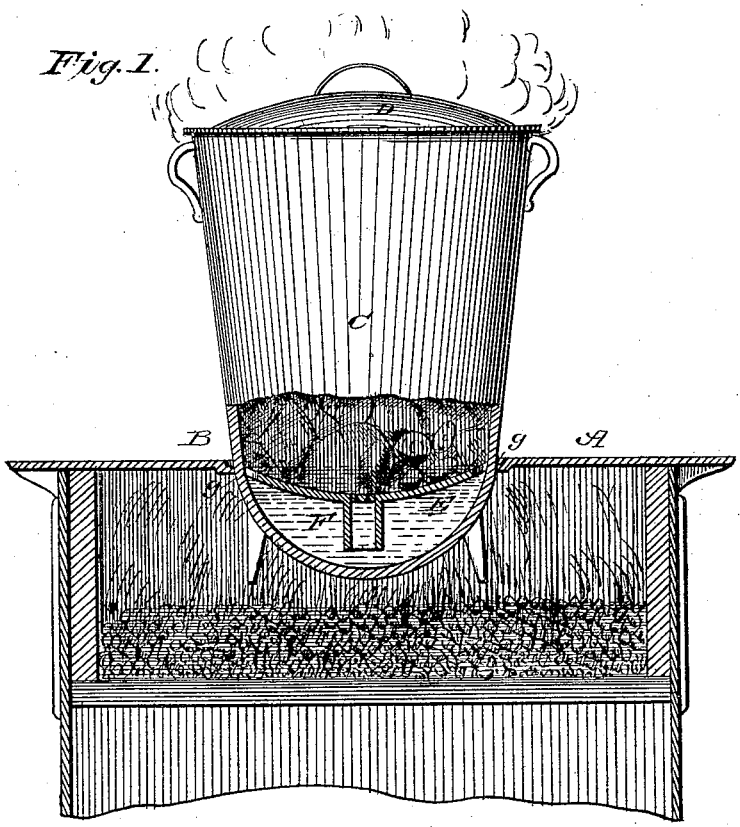
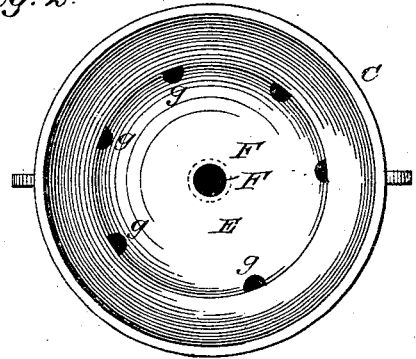
WITNESSES
Fred. G. Dieterich.
INVENTOR
James J. Johnston

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

DINNER-POT.

SPECIFICATION forming part of Letters Patent No. 265,610, dated October 10, 1882.

Application filed February 23, 1882. (No model.)

To all whom it may concern:

Be it known that I, JAMES J. JOHNSTON, of Columbiana, in the county of Columbiana and State of Ohio, have invented a certain new and useful Improvement in Dinner-Pots; and I do hereby declare that the following is a full, clear, and exact description thereof, reference being had to the accompanying drawings, and to the letters of reference marked thereon.

My invention relates to an improvement in dinner-pots; and it consists in furnishing the pot with a secondary detachable bottom concave on its upper surface, having a central tube and recesses in its periphery, and arranged in the pot so that the periphery of said disk will be on about a horizontal plane with the flange supporting the stove-lid of the stove, in which the pot may be placed, as and for the purpose which will hereinafter more fully and at large appear.

To enable others skilled in the art with which my invention is most nearly connected to make and use it, I will proceed to describe its construction and operation.

In the accompanying drawings, which form part of this specification, Figure 1 is a side elevation of a dinner-pot, the lower portion represented in section and furnished with my improvement in secondary bottom, representing said pot placed in the opening of a stove. Fig. 2 represents a top view of the dinner-pot furnished with my improvement in secondary bottom, with the lid of the pot removed.

Reference being had to the accompanying drawings, A represents a section of an ordinary cook-stove, in the opening of which is placed the dinner-pot C, which is of ordinary construction, and furnished with a lid, D, said pot being also furnished with my improved secondary bottom E, which in cross-section is in the form of an inverted arch, and is furnished with a downward-projecting tube, F, the periphery of said secondary bottom having in it a series of notches or recesses, g. Said secondary bottom is detachable, and by preference is constructed of cast-iron, and the object of said secondary bottom is to avoid liability of burning the articles being cooked in said dinner-pot, which burning is of frequent occurrence, notwithstanding the watchfulness and care of the cook; and it is also a matter of observation, in boiling potatoes and other articles which require, in the nomenclature of the kitchen, to be "boiled dry," that at a point between the plane of the liquid in the pot and that of the flange B for the lid of the stove the articles in the pot are frequently burned, forming a crust on the inner wall of the pot at some point between said planes.

By the use of the secondary bottom, constructed and arranged in the pot as shown in the accompanying drawings, with the periphery of said secondary bottom on about a plane with the flange of the lid, and furnished with notches or recesses g and a downward-projecting tube, F, the liability of burning the articles in the process of boiling them will be almost entirely avoided, for the articles placed in the pot at the side of it are above the plane of the under side of the flange B for the lid of the stove, and when the water has evaporated below said plane the steam or vapor will pass up through the recesses g, and thereby prevent the burning of the articles in the process of boiling; and when the water is evaporated below the lower end of the tube F steam will pass up through said tube and up through said recesses until the liquid in the pot and below the secondary bottom is entirely evaporated, thus avoiding almost all liability of burning the articles being cooked, unless in cases of extreme heat in the stove. By the arrangement of the secondary bottom, as shown and described, the cook is enabled to "boil dry" perfectly in cases requiring it, the advantage of which will be apparent to all persons versed in cookery.

Having thus described my improvement, what I claim is—

In a dinner-pot, the secondary bottom E, having downwardly-projecting tube F and notches or recesses g in its periphery, the pot being of such diameter that its point of contact with the flanges B of the stove-hole shall be on the same horizontal plane as the periphery of the secondary bottom, substantially as herein described, and for the purpose set forth.

JAMES J. JOHNSTON.

Witnesses:
 A. C. JOHNSTON,
 T. D. D. OURAND.